United States Patent
Miyasaka et al.

(10) Patent No.: US 9,926,220 B2
(45) Date of Patent: Mar. 27, 2018

(54) GLASS FOR CHEMICAL STRENGTHENING, CHEMICALLY STRENGTHENED GLASS, AND METHOD FOR MANUFACTURING CHEMICALLY STRENGTHENED GLASS

(71) Applicant: Asahi Glass Company, Limited, Chiyoda-ku (JP)

(72) Inventors: Junko Miyasaka, Tokyo (JP); Seiki Ohara, Tokyo (JP); Shuji Yamazaki, Tokyo (JP); Shusaku Akiba, Tokyo (JP); Junichiro Kase, Tokyo (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 0 days.

(21) Appl. No.: 15/266,157

(22) Filed: Sep. 15, 2016

(65) Prior Publication Data

US 2017/0001903 A1 Jan. 5, 2017

Related U.S. Application Data

(63) Continuation of application No. PCT/JP2015/059221, filed on Mar. 25, 2015.

(30) Foreign Application Priority Data

Mar. 28, 2014 (JP) ................. 2014-070098

(51) Int. Cl.
C03C 3/087 (2006.01)
C03C 21/00 (2006.01)
C03C 4/18 (2006.01)

(52) U.S. Cl.
CPC ............ *C03C 3/087* (2013.01); *C03C 4/18* (2013.01); *C03C 21/002* (2013.01); *C03C 2204/00* (2013.01)

(58) Field of Classification Search
CPC ............................ C03C 3/087; C03C 21/002
See application file for complete search history.

(56) References Cited

U.S. PATENT DOCUMENTS 6,518,211 B1 2/2003 Bradshaw et al.
2010/0047521 A1 2/2010 Jaymin Amin et al.
(Continued)

FOREIGN PATENT DOCUMENTS

CN 101575167 A 11/2009
GB 2 335 423 A 9/1999
(Continued)

OTHER PUBLICATIONS

International Search Report dated Jun. 2, 2015 in PCT/JP2015/059221, filed Mar. 25, 2015 (with English Translation).
(Continued)

*Primary Examiner* — Karl E Group
(74) *Attorney, Agent, or Firm* — Oblon, McClelland, Maier & Neustadt, L.L.P.

(57) ABSTRACT

An object of the present invention is to provide a glass for chemical strengthening which is capable of improving strength as compared with an ordinary soda lime silicate glass even when the same chemical strengthening treatment as that in a conventional process is applied and has good devitrification characteristics, a chemically strengthened glass using the glass for chemical strengthening, and a method for producing the chemically strengthened glass. The present invention provides a glass for chemical strengthening having a specific glass composition described in the present specification.

14 Claims, 1 Drawing Sheet

(56) References Cited

U.S. PATENT DOCUMENTS

| | | | |
|---|---|---|---|
| 2012/0251743 A1 | 10/2012 | Amin et al. | |
| 2013/0004758 A1* | 1/2013 | Dejneka | C03C 3/087 428/220 |
| 2013/0203584 A1 | 8/2013 | Arai et al. | |
| 2013/0302618 A1* | 11/2013 | Kuhnemann | C03C 3/087 428/410 |
| 2014/0227525 A1 | 8/2014 | Matsuda et al. | |
| 2014/0234607 A1 | 8/2014 | Matsuda et al. | |
| 2014/0248495 A1 | 9/2014 | Matsuda et al. | |
| 2014/0329661 A1 | 11/2014 | Arai et al. | |
| 2015/0017412 A1 | 1/2015 | Murata et al. | |
| 2015/0368145 A1* | 12/2015 | Senshu | C03C 3/087 428/410 |
| 2015/0376050 A1* | 12/2015 | Nakamura | C03C 3/087 428/410 |
| 2016/0214885 A1 | 7/2016 | Senshu et al. | |
| 2017/0107141 A1* | 4/2017 | Miyasaka | C03C 3/087 |

FOREIGN PATENT DOCUMENTS

| | | |
|---|---|---|
| JP | 2002-507538 A | 3/2002 |
| JP | 2011-148685 | 8/2011 |
| JP | 2012-500177 | 1/2012 |
| JP | 2013-048222 | 3/2013 |
| JP | WO2013/047676 A1 | 4/2013 |
| JP | 2013-139381 | 7/2013 |
| JP | 2013-170087 | 9/2013 |
| JP | 2013-193887 | 9/2013 |
| JP | 2013-247238 | 12/2013 |
| JP | 2014-506553 | 3/2014 |
| WO | WO2012/057232 | 5/2012 |
| WO | WO2014/148020 | 9/2014 |

OTHER PUBLICATIONS

Written Opinion dated Jun. 2, 2015 in PCT/JP2015/059221, filed Mar. 25, 2015.

Extended European Search Report dated Sep. 5, 2017 in Patent Application No. 15769494.4.

\* cited by examiner

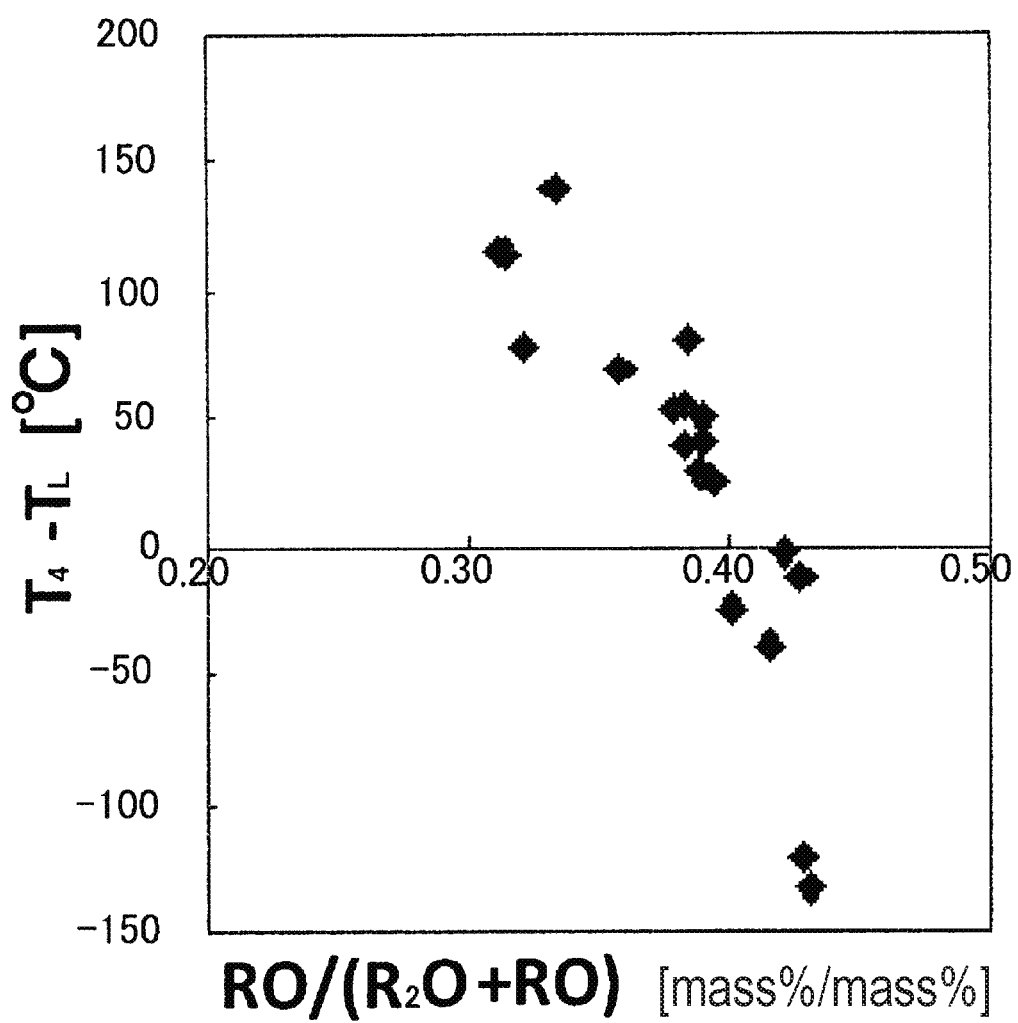

GLASS FOR CHEMICAL STRENGTHENING, CHEMICALLY STRENGTHENED GLASS, AND METHOD FOR MANUFACTURING CHEMICALLY STRENGTHENED GLASS

TECHNICAL FIELD

The present invention relates to a glass for chemical strengthening, favorable as a mother sheet glass for a chemically strengthened glass that is used in a cover glass and a touch sensor glass of a touch panel display equipped in information instruments such as tablet PCs, notebook-size PCs, smartphones, e-book readers, etc., a cover glass of liquid-crystal televisions, PC monitors, etc., a cover glass of automobile instrument panels, etc., a cover glass for solar cells, and a multilayer glass for use in windows of buildings and houses, etc., to a chemically strengthened glass using the glass for chemical strengthening, and to a method for producing the chemically strengthened glass.

BACKGROUND ART

Recently, as for information instruments, ones equipped with a touch panel display have become mainstream, as seen in tablet PCs, smartphones, e-book readers, etc. A touch panel display has a structure where a touch sensor glass and a cover glass are layered on a glass substrate for display. There is also known one with an integrated configuration of a touch sensor glass and a cover glass, which is called OGS (one glass solution).

In a touch sensor glass, a cover glass and an OGS glass, any glass is desired to be thin and have a high strength, for which a glass that has been chemically strengthened through ion exchange, that is, a chemically strengthened glass is used.

The strength characteristics of these chemically strengthened glasses are generally expressed as a surface compressive stress (CS, compressive stress) and a depth of compressive stress (DOL, depth of layer). In the case where a mother sheet glass of ordinary soda lime silicate glass is subjected to chemical strengthening treatment, in general, a chemically strengthened glass having CS of 500 to 600 MPa and DOL of 6 to 10 μm can be obtained.

There has been proposed an aluminosilicate glass having an easily ion-exchangeable composition for enhancing the strength, and in the case where a mother sheet glass of an aluminosilicate glass is subjected to the same chemical strengthening treatment, there can be obtained a chemically strengthened glass having CS of 700 to 850 MPa and DOL of 20 to 100 μm.

However, since the aluminosilicate glass exhibits a high ion-exchanging rate but has a high viscosity, it is problematic in that the productivity thereof is poor and the production cost thereof is high.

On the other hand, soda lime silicate glass is inexpensive as compared with aluminosilicate glass. However, regarding the chemically strengthened glass of an already-existing soda lime glass, since the ion-exchanging rate thereof is low, CS thereof could hardly be increased to a level of glass strength that has become required recently. Accordingly, there has been proposed a chemical strengthening treatment method that can increase the glass strength in a chemically strengthened glass using a soda lime silicate glass (for example, PTL 1).

Moreover, in the chemical strengthening treatment, in order to perform ion exchange efficiently, it is effective to make MgO contained. MgO is known to have the largest effect of accelerating alkali ion exchange among the components of alkaline earth metal oxides (RO) (for example, PTL 2). Since MgO has an action to raise the liquidus temperature $T_L$, i.e., the devitrification temperature, PTL 2 discloses a glass composition containing SrO for compensating it.

CITATION LIST

Patent Literatures

PTL 1: WO2013/47676
PTL 2: JP-A-2013-193877

SUMMARY OF THE INVENTION

Problems that the Invention is to Solve

However, SrO is a component for inhibiting ion exchange and the composition was not necessarily sufficient for improving the ion exchangeability and also improving the devitrification characteristics.

An object of the present invention is to provide a glass for chemical strengthening which is capable of improving strength as compared with an ordinary soda lime silicate glass even when the same chemical strengthening treatment as that in a conventional process is applied and has good devitrification characteristics, a chemically strengthened glass using the glass for chemical strengthening, and a method for producing the chemically strengthened glass.

Means for Solving the Problems

The present inventors have found that, by adopting a specific glass composition, there is obtained a glass for chemical strengthening having good chemical strengthening characteristics as compared with an ordinary soda lime silicate glass and improved devitrification characteristics and exhibiting an excellent productivity with a viscosity comparable to the ordinary soda lime silicate glass, and thus have completed the present invention.

Specifically, the present invention is as follows.

A glass for chemical strengthening, containing, as expressed by mass percentage based on oxides, 60 to 72% of $SiO_2$, 4.4 to 10% of $Al_2O_3$, 5 to 10.9% of MgO, 0.1 to 5% of CaO, 14 to 19% of $Na_2O$, and 0 to 3% of $K_2O$, in which RO is 7% or more and 11% or less (in which the RO represents the sum of alkaline earth metal oxides, i.e., MgO, CaO, SrO, and BaO) and $RO/(RO+R_2O)$ is 0.20 or more and 0.42 or less (in which the $R_2O$ represents the sum of alkali metal oxides).

Advantage of the Invention

The glass for chemical strengthening of the present invention has a specific composition, and particularly, the contents of $Al_2O_3$, CaO and MgO, RO and $RO/(RO+R_2O)$ fall within specific ranges. Thereby, there can be provided a chemically strengthened glass which is easily strengthened during chemical strengthening as compared with an ordinary soda lime silicate glass, has good devitrification characteristics, and exhibits an excellent productivity with a viscosity comparable to the ordinary soda lime silicate glass.

BRIEF DESCRIPTION OF THE DRAWINGS

The FIGURE is a diagram indicating the correlation between values of RO/(RO+R$_2$O) and values of T$_4$-T$_L$ of the glass for chemical strengthening.

MODES FOR CARRYING OUT THE INVENTION

<Glass for Chemical Strengthening>

One embodiment of the present invention is described below. The glass for chemical strengthening of the present embodiment contains, as expressed by mass percentage based on oxides, 60 to 72% of SiO$_2$, 4.4 to 10% of Al$_2$O$_3$, 5 to 10.9% of MgO, 0.1 to 5% of CaO, 14 to 19% of Na$_2$O, and 0 to 3% of K$_2$O, in which RO is 7% or more and 11% or less and RO/(RO+R$_2$O) is 0.20 or more and 0.42 or less. Here, the "glass for chemical strengthening" refers to a glass capable of being subjected to ion exchange and a glass suitable for chemical strengthening treatment.

The reason why the glass composition of the glass for chemical strengthening of the present embodiment is defined to be within the above-mentioned range is described below.

SiO$_2$ is known as a component to form a network structure in a glass microstructure, and is a main component to constitute a glass. The content of SiO$_2$ is 60% or more, preferably 62% or more, more preferably 63% or more, and further preferably 64% or more. The content of SiO$_2$ is 72% or less, preferably 70% or less and more preferably 69% or less. When the content of SiO$_2$ is 60% or more, it is advantageous in point of stability and weather resistance as a glass. On the other hand, when the content of SiO$_2$ is 72% or less, it is advantageous in point of meltability and formability.

Al$_2$O$_3$ has an action of improving ion exchangeability in chemical strengthening, and especially the action thereof for improving CS is great. It is also known as a component for improving the weather resistance of glass. In addition, it has an action of inhibiting invasion of tin from the bottom surface in a float forming. The content of Al$_2$O$_3$ is 1% or more, preferably 3% or more, more preferably 4% or more, further preferably 4.4% or more, and particularly preferably 5% or more. The content of Al$_2$O$_3$ is 10% or less, more preferably 9% or less, further preferably 8% or less, and particularly preferably 7% or less.

When the content of Al$_2$O$_3$ is 1% or more, a desired CS value can be obtained through ion exchange, and the effect of preventing invasion of tin can be realized. On the other hand, when the content of Al$_2$O$_3$ is 10% or less, the devitrification temperature would not rise so greatly even when the viscosity of glass is high, which is therefore advantageous in point of melting and forming in a soda lime glass production line.

MgO is a component for stabilizing a glass, and is essential. The content of MgO is 5% or more, preferably 6% or more, more preferably 7% or more, and further preferably 8% or more. The content of MgO is 12% or less, preferably 10.9% or less, more preferably 10% or less, and further preferably 9% or less. When the content of MgO is 5% or more, the chemical resistance of the glass is good. In addition, the meltability at a high temperature is good and devitrification would hardly occur. On the other hand, when the content of MgO is 12% or less, the property that devitrification hardly occurs can be maintained and a sufficient ion-exchanging rate can be obtained.

CaO is a component for stabilizing a glass, and is essential. CaO tends to inhibit alkali ion exchange, and when DOL is desired to be large, it is preferable that the content thereof is reduced. The content of CaO is 0.1% or more, preferably 0.5% or more and more preferably 0.8% or more. The amount of CaO, if contained, is 5% or less, preferably 4% or less and more preferably 3% or less. When the content of CaO is 5% or less, a sufficient ion-exchanging rate can be maintained and a desired DOL can be obtained.

On the other hand, for enhancing chemical resistance, it is preferable that it is contained in an amount of 0.5% or more, preferably 1% or more, more preferably 2% or more, and further preferably 3% or more.

Na$_2$O is an essential component for forming a surface compressive stress layer through ion exchange, and has an action of increasing DOL while inhibiting a CS decrease. In addition, it is a component for lowering the high-temperature viscosity and the devitrification temperature of glass, and improving the meltability and formability of glass. The content of Na$_2$O is 13% or more, preferably 14% or more and more preferably 15% or more. In turn, the content of Na$_2$O is 19% or less, preferably 18% or less and more preferably 17% or less.

When the content of Na$_2$O is 13% or more, a desired surface compressive stress layer can be formed through ion exchange. On the other hand, when the content of Na$_2$O is 19% or less, sufficient weather resistance can be realized.

Though not essential, K$_2$O may be contained since it has an effect of increasing an ion-exchanging rate and increasing DOL. On the other hand, when K$_2$O is contained too much, a sufficient CS could not be obtained. The amount of K$_2$O, if contained, is 5% or less, preferably 3% or less, more preferably 2% or less, and further preferably 1% or less. When the content of K$_2$O is 5% or less, a sufficient CS can be obtained.

Though not essential, SrO may be contained since it has an effect of improving devitrification characteristics. On the other hand, when SrO is contained too much, a sufficient DOL could not be obtained. The amount of SrO, if contained, is 3% or less, preferably 2% or less and more preferably less than 1%. When the content of SrO is 3% or less, a sufficient DOL can be obtained.

Though not essential, BaO may be contained since it has an effect of improving devitrification characteristics. On the other hand, when BaO is contained too much, a sufficient DOL could not be obtained. The amount of BaO, if contained, is 2% or less and preferably 1% or less. When the content of BaO is 2% or less, a sufficient DOL can be obtained.

RO (here, RO is the sum of alkaline earth metal oxides, i.e., MgO, CaO, SrO, and BaO) is a component of improving meltability and also a component useful for controlling Tg and a strain point. The content of RO is preferably 5.1% or more, more preferably 7% or more, further preferably 8% or more, and most preferably 9% or more. Also, it is preferably 11% or less, more preferably 10.5% or less and further preferably 10.3% or less. When RO is 5.1% or more, meltability can be improved. Moreover, when RO is 11% or less, devitrification characteristics can be improved.

As a result of analyzing the correlation between the devitrification characteristics and RO/(RO+R$_2$O) (here, R$_2$O is the sum of alkali metal oxides), the inventors of the present application have found the correlation as indicated in the FIGURE. In the FIGURE, T$_4$ indicates the temperature at which the viscosity is 10$^4$ dPa·s and T$_L$ indicates the devitrification temperature, so that T$_4$-T$_L$ indicates the devitrification characteristics.

In the case of performing glass formation, T$_4$-T$_L$ is preferably −50° C. or higher, more preferably −30° C. or higher and further preferably −10° C. or higher. Particularly, for the production by a float process or the like without possibility of devitrification, it is preferably 0° C. or higher, more preferably 10° C. or higher and further preferably 20° C. or higher.

As shown in the FIGURE, when the value of $RO/(RO+R_2O)$ exceeds 0.42, $T_4$-$T_L$ becomes lower than 0° C. and devitrification is prone to occur. Therefore, in the glass for chemical strengthening of the present invention, the value of $RO/(RO+R_2O)$ is 0.42 or less, preferably 0.41 or less, more preferably 0.40 or less, and further preferably 0.39 or less. Also, the value of $RO/(RO+R_2O)$ is 0.20 or more, preferably 0.25 or more, more preferably 0.30 or more, and most preferably 0.35 or more. When the value of $RO/(RO+R_2O)$ is 0.20 or more, the thermal expansion coefficient (CTE) can be suppressed low.

In order to enhance durability to thermal shock, CTE is preferably $150 \times 10^{-7}$ $C.^{-1}$ or less, more preferably $120 \times 10^{-7}$ $C.^{-1}$ or less and further preferably $100 \times 10^{-7}$ $C.^{-1}$ or less.

High-temperature viscosity is a physical property value that is an index for glass production and, as an index of melting temperature of glass, a temperature ($T_2$) at which a viscosity is $10^2$ dPa·s has been set. $T_2$ is preferably 1550° C. or lower, more preferably 1530° C. or lower and further preferably 1510° C. or lower, from the viewpoint of a balance between the meltability of a raw material and the life of production facilities or the production cost.

As an index of a temperature at which formation is performed, the temperature ($T_4$) at which the viscosity is $10^4$ dPa·s has been set. In the formation by a float process, since devitrification would hardly occur during the forming when $T_4$ is higher than the devitrification temperature $T_L$, $T_4$ is preferably high. It is preferably 1000° C. or higher, more preferably 1020° C. or higher, further preferably 1040° C. or higher, and most preferably 1060° C. or higher. On the other hand, when it is too high, the life of a float bath is shortened and the production cost increases, so that the case is not preferable. $T_4$ is preferably 1130° C. or lower, more preferably 1110° C. or lower and further preferably 1090° C. or lower.

In addition, a sulfate, a chloride, a fluoride, or the like may be suitably contained as a clarifying agent in melting a glass. The glass of the present invention is essentially formed of the above-mentioned components but may contain any other components within a range not detracting from the object of the present invention. In the case where such components are contained, the total content of the components is preferably 4% or less, more preferably 1% or less and typically 0.5% or less. Hereinafter the above-mentioned other components will be described exemplarily.

$B_2O_3$ may be contained in a range of 4% or less for improving the meltability at a high temperature or the strength of the glass. It is preferably 1% or less. In general, when $B_2O_3$ is contained together with an alkali component of $Na_2O$ or $K_2O$, evaporation thereof may occur vigorously to greatly corrode bricks. Therefore, it is preferable that $B_2O_3$ is not substantially contained.

$Fe_2O_3$ exists anywhere in the natural world and production lines, and therefore it is a component extremely difficult to make the content thereof zero. It is known that $Fe_2O_3$ in an oxidized state causes coloration in yellow and FeO in a reduced state causes coloration in blue, and it is also known that glass may color in green depending on the balance of the two. The content of $Fe_2O_3$ is typically 0.005% or more, and for inhibiting coloring, it is preferably 1% or less and more preferably 0.2% or less. When $Fe_2O_3$ is 1% or less, coloring of the glass can be avoided.

$TiO_2$ much exists in natural resources, and is known to be a coloring source of yellow. The amount of $TiO_2$, if contained, is preferably 1% or less, more preferably 0.5% or less and further preferably 0.2% or less. When the content of $TiO_2$ is 1% or less, the phenomenon that the glass becomes yellowish can be avoided.

ZnO may be contained, for example, in an amount of up to 2% for improving the meltability of glass at a high temperature. However, in the case of production according to a float process, it may be reduced in a float bath to cause defects in products, and is therefore preferably not contained.

$ZrO_2$ may be contained in a concentration of 4% or less, in order to improve CS. The amount of $ZrO_2$, if contained, is preferably 2% or less and more preferably 1% or less. When $ZrO_2$ is 4% or less, an elevation of the devitrification temperature can be avoided.

$Li_2O$ is a component that lowers Tg to facilitate stress relaxation, therefore making it difficult to obtain a stable surface compressive stress layer. It is therefore preferably not contained. Even when it is contained, the content thereof is preferably less than 1%, more preferably 0.1% or less and particularly preferably less than 0.01%.

The glass for chemical strengthening of the present embodiment is generally tabular, but may be a planar sheet or a bent-processed glass sheet. The glass for chemical strengthening of the present embodiment is a glass sheet that has been formed in a planar sheet form by an already known glass forming method such as a float process, a fusion process or a slot downdraw process.

The glass for chemical strengthening of the present embodiment has a size that can be formed according to an already existing forming method. Specifically, when formed by a float process, a continuous ribbon-shaped glass having a float-forming width can be obtained. The glass for chemical strengthening of the present embodiment is finally cut into a size suitable for the intended use.

Specifically, it may have a size of displays of such as tablet PCs, smartphones, etc., or a size of windowpanes of buildings or houses. The glass of the present embodiment is generally cut in a rectangular form, but may also be in any other form such as a circular form or a polygonal form with no problem, including a perforated glass.

<Chemical Strengthening Treatment>

The chemical strengthening treatment may be performed according to a conventionally known method. It is preferred that, before the chemical strengthening treatment, a shaping process according to uses, for example, mechanical processing such as cutting, end-surface processing or perforation is performed.

In the chemical strengthening treatment, a glass substrate is brought into contact with a melt of an alkali metal salt (for example, a potassium nitrate salt) containing an alkali metal ion having a large ion radius (typically, K ion) by immersing, and thereby, the metal ion having a small ion radius (typically, Na ion) in the glass substrate is replaced with the metal ion having a large ion radius.

The chemical strengthening treatment may be performed, for example, by immersing a glass sheet in a potassium nitrate molten salt at 330 to 550° C. for 5 minutes to 20 hours. As the conditions of the ion exchange, optimum conditions may be selected in consideration of the viscosity characteristics of glass, uses, sheet thickness, the tensile stress inside the glass, and the like.

Examples of the molten salts for performing the ion-exchange treatment include alkali nitrate salts, alkali sulfate salts and alkali chloride salts such as a potassium nitrate salt, a potassium sulfate salt and a potassium chloride salt. These molten salts may be used alone or a plurality thereof may be used in combination. Moreover, in order to regulate the chemical strengthening characteristics, a salt containing sodium may be mixed therein.

In the present invention, the treatment conditions of the chemical strengthening treatment are not particularly limited, and optimum conditions may be selected in consideration of the glass characteristics, the molten salt, and the like.

<Chemically Strengthened Glass>

The chemically strengthened glass (hereinafter also referred to as chemically strengthened glass of the present invention) obtained by chemically strengthening the glass for chemical strengthening of the present invention has a compressive stress layer on the surface through the ion-exchange treatment. Surface compressive stress is preferably 300 MPa or more and more preferably 500 MPa or more.

Furthermore, since generation of scratches exceeding the depth of the surface compressive stress layer during the use of a chemically strengthened glass leads to breakage of the glass, the surface compressive stress layer is preferably deep and is preferably 10 μm or more, more preferably 12 μm or more and further preferably 14 μm or more. Moreover, in order to enable cutting after the chemical strengthening treatment, it is preferably 40 μm or less and more preferably 30 μm or less.

The depth of the surface compressive stress layer and the value of the surface compressive stress of the chemically strengthened glass of the present invention can be measured by using a surface stress meter (for example, FSM-6000, manufactured by Orihara Manufacturing Co., Ltd.) or the like.

The chemically strengthened glass of the present invention preferably has, on the surface thereof, at least one kind selected from the group consisting of a sodium ion, a silver ion, a potassium ion, a cesium ion, and a rubidium ion. Thereby, a compressive stress is induced on the surface and the glass is highly strengthened. Moreover, when the glass has a silver ion on the surface thereof, antibacterial properties can be imparted thereto.

By chemically strengthening the glass for chemical strengthening of the present invention, a chemically strengthened glass product can be obtained. As the chemically strengthened glass product, there may be mentioned cover glasses of display devices or the like and glass substrates of displays.

The uses of the chemically strengthened glass of the present invention are not particularly limited. Since it has high mechanical strength, it is suitable for use in the portions at which shock by dropping and contact with other materials are expected.

Specifically, for example, there are protective uses for machines and instruments, such as cover glasses for display sections of mobile phones (including multifunctional information terminals such as smartphones), PHS, PDA, tablet-type terminals, note-type personal computers, game machines, mobile music/video players, electronic books, electronic terminals, clocks and watches, cameras, GPS, etc. and touch sensor glasses of monitors for touch panel operation of these devices, cover glasses of cooking appliances such as microwave ovens and oven toasters, top plates of electromagnetic cooking appliances, cover glasses of measuring instruments such as meters and gauges, and glass sheets for reading sections of copiers, scanners, etc.

Moreover, for example, there may be mentioned uses of windowpanes of buildings, houses, vehicles, ships, aircraft, etc., cover glasses of domestic or industrial illumination devices, signals, guide lights, and electric bulletin boards, showcases, bulletproof glasses, and the like. Also mentioned are uses of cover glasses for solar cell protection and light-condensing glass materials for enhancing power generation efficiency of solar cells.

Furthermore, for example, there may be mentioned uses as water tanks, table wares such as dishes and cups, various cooking wares such as bottles and chopping boards, cupboards, shelf boards and walls of refrigerators, and building materials such as roofs and partitions.

In addition to these uses, the chemically strengthened glass produced by finishing the chemical strengthening treatment is most suitable as a glass material for displays to be incorporated into various image displaying devices such as liquid-crystal ones, plasma ones or organic EL ones.

EXAMPLES

Working Examples of the present invention is specifically described below but the present invention is not limited to these.

Preparation of Glass for Chemical Strengthening

For each of Examples 1 to 23 in Table 1 and Table 2, so that the composition as expressed by mass percentage in the columns of $SiO_2$ to $K_2O$ was attained, generally used glass raw materials such as oxides, hydroxides, carbonates, and nitrates were appropriately selected and were weighed so as to be 900 g as glass. Then, the mixed raw materials were placed in a platinum crucible, charged into a resistance heating electric furnace at 1600° C., melted for 4 hours, and thus defoamed and homogenized.

The molten glass obtained was poured into a mold material and, after held at a temperature of Tg+30° C. for 1 hour, was cooled to room temperature at a rate of 1° C./minute to obtain a glass block. The glass block was cut and ground and finally both faces were mirror-processed to obtain a sheet glass (glass for chemical strengthening) having a size of 20 mm×20 mm and a thickness of 1 mm. Specific gravity, Tg, $T_2$, $T_4$, $T_L$, and CTE of the glass were measured. Results thereof are shown in Table 1 and Table 2.

The glass for chemical strengthening obtained was immersed in a molten salt of 97.8% of $KNO_3$ and 2.2% of $NaNO_3$ at 425° C. for 2 hours and 30 minutes for chemical strengthening treatment, thereby obtaining a chemically strengthened glass. For each glass after the chemical strengthening treatment, CS and DOL were measured. Results thereof are shown in Table 1 and Table 2.

[Evaluation Methods]

(1) Specific Gravity

The specific gravity was measured according to an Archimedes' method. The numerical values in parentheses in Table 1 and Table 2 represent calculated values. The calculated values were determined by preparing a linear regression equation from the measured values of specific gravity and glass compositions, followed by calculation.

(2) Glass Transition Point (Tg)

The glass transition point was measured with TMA. The numerical values in parentheses in Table 1 and Table 2 represent calculated values. The calculated values were determined by preparing a linear regression equation from the measured values of Tg and glass compositions, followed by calculation.

(3) High-Temperature Viscosity

The temperature ($T_2$) at which the viscosity is $10^2$ dPa·s and the temperature ($T_4$) at which the viscosity is $10^4$ dPa·s were measured by using a rotational viscometer. The numerical values in parentheses in Table 1 and Table 2 represent calculated values. The calculated values were determined by preparing linear regression equations from the measured values of $T_2$ and $T_4$ and glass compositions, followed by calculation.

(4) CTE

CTE was measured, based on JIS R 1618:2002, at a temperature-raising rate of 5° C./minute as a mean linear thermal expansion coefficient at 50 to 350° C. by using a thermal expansion meter (TD5000SA, manufactured by Bruker AXS K.K.) as well as measurement of the glass transition point (Tg). The numerical values in parentheses in Table 1 and Table 2 represent calculated values. The calculated values were determined by preparing a linear regression equation from the measured values of CTE and glass compositions, followed by calculation.

(5) Devitrification Temperature ($T_L$)

Regarding the devitrification temperature, the glass was ground into glass grains of about 2 mm in a mortar, and the glass grains were spread in a platinum boat, followed by heat-treating at intervals of 5° C. for 24 hours in a temperature gradient furnace. The maximum value of the temperature of the glass grains in which a crystal is deposited is referred to as the devitrification temperature.

(6) Surface Compressive Stress (CS) and Depth of Compressive Stress Layer (DOL)

The surface compressive stress and the depth of the compressive stress layer were measured by using a surface stress meter FSM-6000, manufactured by Orihara Manufacturing Co., Ltd. The numerical values in parentheses in Table 1 and Table 2 represent calculated values. The calculated values were determined by preparing linear regression equations from the measured values of CS and DOL and glass compositions, followed by calculation.

TABLE 1

| (mass %) | Ex. 1 | Ex. 2 | Ex. 3 | Ex. 4 | Ex. 5 | Ex. 6 |
|---|---|---|---|---|---|---|
| $SiO_2$ | 65.6 | 64.3 | 64.1 | 66.8 | 67.2 | 68.1 |
| $Al_2O_3$ | 5.3 | 7.8 | 7.8 | 5.6 | 7.5 | 6.7 |
| MgO | 9.4 | 5.5 | 5.6 | 7.3 | 5.5 | 6.7 |
| CaO | 1.0 | 2.6 | 2.3 | 1.0 | 3.5 | 2.9 |
| SrO | 0.0 | 0.0 | 0.3 | 0.0 | 0.0 | 0.0 |
| BaO | 0.0 | 0.0 | 0.0 | 0.0 | 0.0 | 0.0 |
| $ZrO_2$ | 1.9 | 2.0 | 2.0 | 2.7 | 0.0 | 0.0 |
| $Na_2O$ | 16.8 | 15.8 | 15.9 | 16.6 | 16.2 | 15.7 |
| $K_2O$ | 0.0 | 2.0 | 2.0 | 0.0 | 0.0 | 0.0 |
| CS (MPa) | 844 | 771 | 745 | 800 | 749 | 751 |
| DOL (μm) | 12.0 | 17.9 | 18.5 | 15.6 | 14.0 | 13.5 |
| Specific gravity | (2.506) | (2.512) | (2.514) | 2.500 | (2.478) | (2.469) |
| Tg (° C.) | 582.9 | 563 | 563 | 582 | 567 | 574 |
| $T_2$ (° C.) | (1456) | (1496) | (1493) | 1501 | 1505 | 1507 |
| $T_4$ (° C.) | (1069) | (1086) | (1084) | 1100 | 1080 | 1084 |
| CTE ($10^{-7}$ °C.$^{-1}$) | 90.8 | 101.2 | 97.4 | 90.7 | 93.1 | 89.8 |
| $T_L$ (° C.) | 1030 | 970 | 970 | 960 | 1010 | 1030 |
| $T_4 - T_L$ (° C.) | 39 | 116 | 114 | 140 | 70 | 54 |
| RO/(RO + $R_2O$) | 0.38 | 0.31 | 0.31 | 0.33 | 0.36 | 0.38 |
| RO | 10.4 | 8.1 | 8.2 | 8.3 | 9.1 | 9.5 |

| (mass %) | Ex. 7 | Ex. 8 | Ex. 9 | Ex. 10 | Ex. 11 | Ex. 12 |
|---|---|---|---|---|---|---|
| $SiO_2$ | 67.9 | 68.5 | 67.0 | 67.0 | 68.0 | 67.8 |
| $Al_2O_3$ | 5.9 | 5.9 | 6.9 | 7.4 | 5.9 | 5.9 |
| MgO | 8.0 | 8.0 | 8.0 | 8.0 | 9.0 | 8.2 |
| CaO | 2.0 | 2.0 | 2.0 | 2.0 | 1.0 | 2.0 |
| SrO | 0.0 | 0.0 | 0.0 | 0.0 | 0.0 | 0.0 |
| BaO | 0.0 | 0.0 | 0.0 | 0.0 | 0.0 | 0.0 |
| $ZrO_2$ | 0.0 | 0.0 | 0.0 | 0.0 | 0.0 | 0.0 |
| $Na_2O$ | 16.1 | 15.6 | 16.1 | 15.6 | 16.1 | 16.1 |
| $K_2O$ | 0.0 | 0.0 | 0.0 | 0.0 | 0.0 | 0.0 |
| CS (MPa) | 743 | 758 | 779 | 794 | 761.3 | (742) |
| DOL (μm) | 14.1 | 13.6 | 13.9 | 13.4 | 15.1 | (13.3) |
| Specific gravity | (2.468) | 2.469 | 2.476 | 2.476 | 2.469 | 2.478 |
| Tg (° C.) | 570 | 572 | 578 | 584 | 580 | 569 |
| $T_2$ (° C.) | 1472 | (1496) | 1496 | 1504 | 1492 | (1480) |
| $T_4$ (° C.) | 1061 | (1080) | 1086 | 1091 | 1085 | (1069) |
| CTE ($10^{-7}$ °C.$^{-1}$) | 93.1 | 91.0 | 90.0 | 90.3 | 93.0 | 92.7 |
| $T_L$ (° C.) | 980 | 1030 | 1030 | 1050 | 1030 | 1040 |
| $T_4 - T_L$ (° C.) | 81 | 50 | 56 | 41 | 55 | 29 |
| RO/(RO + $R_2O$) | 0.38 | 0.39 | 0.38 | 0.39 | 0.38 | 0.39 |
| RO | 10.1 | 10.0 | 10.0 | 10.0 | 10.0 | 10.3 |

TABLE 2

| (mass %) | Ex. 13 | Ex. 14 | Ex. 15 | Ex. 16 | Ex. 17 | Ex. 18 |
|---|---|---|---|---|---|---|
| $SiO_2$ | 67.7 | 67.4 | 68.2 | 67.9 | 66.7 | 67.0 |
| $Al_2O_3$ | 5.9 | 5.9 | 4.4 | 1.0 | 5.8 | 5.8 |

TABLE 2-continued

| | | | | | | |
|---|---|---|---|---|---|---|
| MgO | 7.7 | 6.7 | 7.7 | 9.0 | 3.8 | 5.3 |
| CaO | 2.7 | 4.0 | 3.6 | 1.0 | 8.0 | 6.0 |
| SrO | 0.0 | 0.0 | 0.0 | 0.0 | 0.0 | 0.0 |
| BaO | 0.0 | 0.0 | 0.0 | 0.0 | 0.0 | 0.0 |
| $ZrO_2$ | 0.0 | 0.0 | 0.0 | 0.0 | 0.0 | 0.0 |
| $Na_2O$ | 16.0 | 16.0 | 14.6 | 16.1 | 15.8 | 15.9 |
| $K_2O$ | 0.0 | 0.0 | 1.0 | 5.0 | 0.0 | 0.0 |
| CS (MPa) | (738) | (730) | (696) | (545) | (707) | (719) |
| DOL (μm) | (12.6) | (11.3) | (11.3) | (19.9) | (7.3) | (9.2) |
| Specific gravity | 2.482 | 2.490 | 2.482 | 2.478 | 2.521 | 2.505 |
| $T_g$ (° C.) | 569 | 564 | 556 | 513 | 564 | 562 |
| $T_2$ (° C.) | (1475) | (1464) | 1488 | (1370) | (1434) | (1449) |
| $T_4$ (° C.) | (1064) | (1055) | 1057 | (978) | (1028) | (1042) |
| CTE ($10^{-7}$ °$C.^{-1}$) | 92.2 | 93.1 | 92.5 | 113.8 | 94.8 | (95.0) |
| $T_L$ (° C.) | 1040 | 1080 | 1060 | 900 | 1040 | 1080 |
| $T_4 - T_L$ (° C.) | 24 | −25 | −3 | 78 | −12 | −38 |
| RO/(RO + $R_2O$) | 0.39 | 0.40 | 0.42 | 0.32 | 0.43 | 0.42 |
| RO | 10.4 | 10.8 | 11.4 | 10.0 | 11.8 | 11.3 |

| (mass %) | Ex. 19 | Ex. 20 | Ex. 21 | Ex. 22 | Ex. 23 |
|---|---|---|---|---|---|
| $SiO_2$ | 62.3 | 62.3 | 71.8 | 68.3 | 60.9 |
| $Al_2O_3$ | 7.1 | 7.0 | 1.9 | 5.0 | 12.8 |
| MgO | 11.9 | 12.4 | 4.6 | 4.1 | 6.7 |
| CaO | 0.8 | 0.4 | 7.8 | 7.0 | 0.1 |
| SrO | 0.4 | 0.4 | 0.0 | 0.0 | 0.2 |
| BaO | 0.0 | 0.0 | 0.0 | 0.0 | 0.2 |
| $ZrO_2$ | 0.0 | 0.0 | 0.0 | 0.0 | 1.0 |
| $Na_2O$ | 16.7 | 17.5 | 13.3 | 15.0 | 12.2 |
| $K_2O$ | 0.9 | 0.0 | 0.3 | 0.1 | 5.9 |
| CS (MPa) | 787 | 817 | 542 | 634 | 717 |
| DOL (μm) | 11.5 | 11.3 | 6.0 | 9.0 | 33.2 |
| Specific gravity | (2.519) | (2.518) | 2.493 | 2.501 | 2.48 |
| $T_g$ (° C.) | 576 | 580.7 | 557 | 556 | 604 |
| $T_2$ (° C.) | 1415 | 1396 | 1447 | 1455 | 1601 |
| $T_4$ (° C.) | 1039 | 1026 | 1039 | 1042 | 1176 |
| CTE ($10^{-7}$ °$C.^{-1}$) | 98.0 | 95.8 | 88.0 | 92.0 | 98.0 |
| $T_L$ (° C.) | 1160 | 1160 | 1030 | 1015 | 1154 |
| $T_4 - T_L$ (° C.) | −122 | −134 | 9 | 27 | 22 |
| RO/(RO + $R_2O$) | 0.43 | 0.43 | 0.48 | 0.42 | 0.28 |
| RO | 13.2 | 13.2 | 12.4 | 11.1 | 7.2 |

In Table 1 and Table 2, Examples 1 to 16 are Working Examples and Examples 17 to 23 are Comparative Examples.

From the results shown in Table 1 and Table 2, the following consideration was obtained.

It is understood that the glass for chemical strengthening of the present invention prepared in each Working Example can effectively improve the DOL value through chemical strengthening, has high $T_4$-$T_L$, and thus can improve devitrification characteristics by controlling particularly the contents of $Al_2O_3$, CaO and MgO, RO and RO/(RO+$R_2O$) to specific ranges.

In contrast, the glasses for chemical strengthening of Examples 17, 18, 21, and 22 of Comparative Examples have compositions containing a little MgO and much CaO. Therefore, it is understood that chemically strengthened glasses obtained by subjecting the glass for chemical strengthening of Examples 17, 18, 21, and 22 to the chemical strengthening treatment have a low DOL and thus are glasses that are difficult to strengthen by chemical strengthening.

In the glasses for chemical strengthening of Examples 19 and 20 of Comparative Examples, the values of RO/(RO+$R_2O$) are both 0.43 and exceed 0.42. Therefore, the values of $T_4$-$T_L$, of the glasses for chemical strengthening of Examples 19 and 20 are −122° C. in Example 19 and −134° C. in Example 20 and are both lower than 0° C. Thus, devitrification characteristics were bad.

In the glass for chemical strengthening of Example 23 of Comparative Example, the content of $Al_2O_3$ is 12.8% and exceeds 10%. Therefore, $T_2$ of the glass for chemical strengthening of Example 23 indicates such a high value as 1601° C. and the viscosity is high.

Moreover, in the glasses for chemical strengthening of Example 15 of Working Example and Examples 17 to 22 of Comparative Examples, RO/(RO+$R_2O$) was larger than 0.41 and the values of $T_4$-$T_L$ were low as compared with those of Examples 1 to 11 of Working Examples in which RO/(RO+$R_2O$) was less than 0.40, so that the value of RO/(RO+$R_2O$) is more preferably 0.40 or less.

Furthermore, in the glasses for chemical strengthening of Example 15 of Working Example and Examples 17 to 22 of Comparative Examples, RO exceeded 11% and the values of $T_4$-$T_L$ were low as compared with those of Examples 1 to 11 of Working Examples in which RO was 11% or less, so that it is more preferable to control RO to 11% or less.

INDUSTRIAL APPLICABILITY

The chemically strengthened glass of the present invention obtained by chemically strengthening the glass for chemical strengthening of the present invention can be utilized for cover glasses in display devices, especially in touch panel displays, etc. In addition, it can also be utilized in multilayer glasses for buildings and houses and for solar cell substrates, etc.

While the present invention has been described in detail and with reference to specific embodiments thereof, it will be apparent to one skilled in the art that various changes and modifications can be made therein without departing from the intent and scope of the present invention. The present application is based on Japanese Patent Application (Application No. 2014-070098) filed on Mar. 28, 2014, and the entire thereof is incorporated herein by reference.

The invention claimed is:

1. A glass, comprising, as expressed by mass percentage based on oxides, 64 to 72% of $SiO_2$, 4.4 to 7% of $Al_2O_3$, 7 to 10.9% of MgO, 0.1 to 5% of CaO, 14 to 19% of $Na_2O$, and 0 to 3% of $K_2O$, wherein RO is 8 to 11% wherein the RO represents the sum of alkaline earth metal oxides, and RO/(RO+$R_2O$) is 0.20 or more and 0.42 or less, wherein the $R_2O$ represents the sum of alkali metal oxides,
and wherein the glass has a temperature ($T_2$) at which a viscosity is $10^2$ dPa·s of 1550° C. or lower.

2. The glass according to claim 1, wherein the RO/(RO+$R_2O$) is 0.40 or less.

3. The glass according to claim 1, comprising 5% or more of $Al_2O_3$.

4. The glass according to claim 1, comprising 8% or more of MgO.

5. The glass according to claim 1, comprising 10% or less of MgO.

6. The glass according to claim 1, further comprising 0 to 4% of $B_2O_3$, 0 to 1% of $Fe_2O_3$ and 0 to 1% of $TiO_2$.

7. The glass according to claim 1, which has been formed according to a float process.

8. A chemically strengthened glass obtained by chemically strengthening the glass according to claim 1.

9. The chemically strengthened glass according to claim 8, having a surface compressive stress of 300 MPa or more.

10. The chemically strengthened glass according to claim 8, having a depth of compressive stress of 10 μm or more.

11. A method for producing a chemically strengthened glass, comprising a chemical strengthening step of subjecting the glass according to claim 1 to an ion-exchange treatment.

12. The glass according to claim 1, comprising 64.1 to 72% of $SiO_2$ and 4.4 to 6.9% of $Al_2O_3$.

13. The glass according to claim 1, comprising 64.3 to 72% of $SiO_2$ and 4.4 to 6.7% of $Al_2O_3$.

14. The glass according to claim 1, comprising 65.6 to 72% of $SiO_2$ and 4.4 to 5.9% of $Al_2O_3$.

* * * * *